(12) United States Patent
Breitbart et al.

(10) Patent No.: US 11,868,627 B2
(45) Date of Patent: Jan. 9, 2024

(54) METHOD FOR OPERATING A PROCESSING UNIT

(71) Applicant: Robert Bosch GmbH, Stuttgart (DE)

(72) Inventors: Jens Breitbart, Wildeck (DE); Sebastian Hoffmann, Bietigheim-Bissingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/217,590

(22) Filed: Mar. 30, 2021

(65) Prior Publication Data

US 2021/0397353 A1  Dec. 23, 2021

(30) Foreign Application Priority Data

Jun. 19, 2020  (DE) .......................... 102020207616.2

(51) Int. Cl.
*G06F 3/06* (2006.01)
*G06F 9/455* (2018.01)
*G06F 11/16* (2006.01)

(52) U.S. Cl.
CPC .......... *G06F 3/0631* (2013.01); *G06F 3/0604* (2013.01); *G06F 3/0673* (2013.01); *G06F 9/45558* (2013.01); *G06F 11/1666* (2013.01); *G06F 2009/45583* (2013.01)

(58) Field of Classification Search
CPC ............. G06F 9/45558; G06F 11/1666; G06F 2009/45583; G06F 3/0631; G06F 3/0604; G06F 3/0673; G06F 12/023; G06F 12/08; G06F 2212/1032; G06F 2212/601; G11C 11/408
See application file for complete search history.

(56) References Cited

U.S. PATENT DOCUMENTS

| | | | |
|---|---|---|---|
| 7,302,526 B1 * | 11/2007 | Cartmell | G06F 11/1666 711/120 |
| 11,593,170 B2 * | 2/2023 | Tsirkin | G06F 9/4555 |
| 2002/0147992 A1 * | 10/2002 | King | H04N 21/42661 725/151 |
| 2004/0041749 A1 * | 3/2004 | Dixon | G09G 3/06 345/33 |

(Continued)

*Primary Examiner* — Loan L. T. Truong
*Assistant Examiner* — Matthew N Putaraksa
(74) *Attorney, Agent, or Firm* — NORTON ROSE FULBRIGHT US LLP; Gerard A. Messina

(57) ABSTRACT

A method for operating a processing unit. The processing unit addresses virtual memory areas in order to access a RAM memory unit and these individual virtual memory areas respectively being mapped onto a physical memory area of the RAM memory unit. A check of the RAM memory unit for errors is performed. If, in the course of this check, a physical memory area of the RAM memory unit is determined to be faulty, this faulty physical memory area is designated as faulty. A check is performed to determine whether a free physical memory area exists in RAM memory unit onto which no virtual memory area is mapped and which is not designated as faulty. If such a free physical memory area exists, the virtual memory area that is currently mapped onto the physical memory area recognized as faulty is henceforth mapped onto this free physical memory area.

9 Claims, 2 Drawing Sheets

(56) References Cited

U.S. PATENT DOCUMENTS

| | | | |
|---|---|---|---|
| 2005/0160151 A1* | 7/2005 | Rawson | G06F 1/3275 709/213 |
| 2007/0073992 A1* | 3/2007 | Allen | G06F 12/08 711/170 |
| 2007/0283115 A1* | 12/2007 | Freeman | G06F 21/6227 711/163 |
| 2009/0144579 A1* | 6/2009 | Swanson | G06F 11/0712 718/1 |
| 2010/0169602 A1* | 7/2010 | Hulbert | G06F 12/0638 711/E12.001 |
| 2012/0124269 A1* | 5/2012 | Garg | G06F 1/3275 711/6 |
| 2014/0207938 A1* | 7/2014 | Abrams | G06F 11/3051 709/224 |
| 2014/0237162 A1* | 8/2014 | Brewer | G06F 3/0613 711/103 |
| 2015/0033002 A1* | 1/2015 | Cordero | G06F 9/45558 713/1 |
| 2017/0132101 A1* | 5/2017 | Cheriton | G06F 11/1417 |
| 2020/0285588 A1* | 9/2020 | Quinn | G06F 9/541 |
| 2020/0319948 A1* | 10/2020 | Singh | G06F 11/0772 |
| 2021/0124496 A1* | 4/2021 | Song | G06F 3/0629 |
| 2021/0318922 A1* | 10/2021 | Roberts | G06F 3/0619 |

\* cited by examiner

METHOD FOR OPERATING A PROCESSING UNIT

CROSS REFERENCE

The present application claims the benefit under 35 U.S.C. § 119 of German Patent Application No. DE 102020207616.2 filed on Jun. 19, 2020, which is expressly incorporated herein by reference in its entirety.

FIELD

The present invention relates to a method for operating a processing unit as well as to a processing unit and to a computer program for implementing the method.

BACKGROUND INFORMATION

For processes to gain access to main memory units (volatile memory, random access memory (RAM)), it is often possible to use so-called virtual memory areas. Actual, physical memory addresses, by which the actual, physical memory areas of the memory units (so-called memory frames) are concretely addressed, are often not known to the processes. With the aid of virtual or logical memory addresses, processes address corresponding virtual or logical memory areas (so-called memory pages). A memory management unit (MMU) may be provided to translate these virtual memory addresses into the respective physical memory addresses and to map accordingly the virtual memory areas onto the actual, physical memory areas. A memory controller is then able to access the physical memory areas with the aid of the physical memory addresses.

SUMMARY

The present invention provides a method for operating a processing unit as well as a processing unit and a computer program for implementing the method. Advantageous developments of the present invention are disclosed herein.

In order to access a RAM memory unit (working memory unit), the processing unit or processes executed in the processing unit address virtual memory areas, in particular via virtual memory addresses. The RAM memory unit may be designed as a DRAM (dynamic RAM) memory, for example.

The individual virtual memory areas are respectively mapped onto a physical memory area, expediently with the aid of a memory management unit (MMU). In the process, in particular, every virtual memory area is mapped unequivocally or precisely onto one physical memory area. In particular, using these physical memory addresses, a memory controller is able to access the actual, physical memory areas of the RAM memory unit.

Expediently, for this purpose, the memory management unit performs a translation of the virtual memory addresses into physical memory addresses. The memory management unit may comprise in particular a memory management table (page table), in which a corresponding allocation of the virtual memory areas to the physical memory areas is stored. A memory management unit expediently may be provided as a hardware unit and/or software unit.

In accordance with an example embodiment of the present invention, the RAM memory unit is checked for errors, for example by the processing unit or by a processor of the processing unit, for example of the memory management unit. The RAM memory unit as a whole may be checked for errors cyclically or at specified intervals, for example. Alternatively or additionally, it is also possible always to check individual physical memory areas for errors whenever they are to be accessed.

If in the course of this check a physical memory area of the RAM memory unit is determined to be faulty, this faulty physical memory area is designated as faulty. This designation, for example, may be performed by the processor or by the memory management unit. For example, the respective physical memory area may be designated as faulty in a further table relating to the RAM memory unit or in a configuration file. In particular, it is possible to store this further table or configuration file in a nonvolatile memory unit of the processing unit.

In particular, a faulty memory area of this type has a permanent irreparable error, in particular a hardware error or a defect of the RAM memory unit. In this faulty memory area, data can no longer be stored correctly. When a process accesses such a faulty memory area, this may result in a error or a faulty execution of the respective process.

If the respective physical memory area is determined to be faulty, a check is performed to determine whether a free physical memory area exists in the RAM memory unit onto which no virtual memory area is mapped and which is further not designated as faulty. This check may be performed for example on the basis of the respective further table or configuration file relating to the RAM memory unit.

If such a free physical memory area exists, the virtual memory area that is now or currently mapped onto the physical memory area recognized as faulty is henceforth mapped onto this free physical memory area. In particular, for this purpose, the corresponding allocation of the virtual memory area is changed accordingly in the memory management table. Thus, if memory areas exist in the RAM memory unit that are still free and unused, one of these free memory areas is used as a replacement for the faulty memory area.

The present method thus provides an option for responding to faulty memory areas in low-expenditure fashion, in particular without extensive changes in hardware or software. Expediently, within the scope of the method in accordance with an example embodiment of the present invention, changes are made only in the memory management unit or the memory management table. In particular, no changes in the application software or in the processes executed in the processing unit are required. The processes continue to address the respective virtual memory areas in order to access the RAM memory unit. Within the scope of the method in accordance with an example embodiment of the present invention, in particular only the allocation of these virtual memory areas to the physical memory areas is changed appropriately, without the processes being informed about this change. The redistribution or new allocation of the virtual memory areas to the physical memory areas is expediently performed automatically by the memory management unit or the memory management table. Expediently, it is possible to continue to execute the processes unchanged, in particular without changes to their concrete source code, without this resulting in errors of the processes when they access the RAM memory unit.

Furthermore, expediently, no hardware measures or changes in the hardware of the processing unit or the RAM memory unit are required within the scope of the present method. In particular, in the course of the present method, the existing hardware or the RAM memory unit is conceptually redistributed or restructured, expediently without changing the hardware itself.

The present method makes it possible to respond to a detected faulty memory area in order to prevent errors in the execution of processes by accessing the faulty memory area. In particular, in the event of an error of the RAM memory unit, it is possible to execute correctly at least the core functions of the processing unit. This makes it possible to increase the reliability and integrity of the processing unit. Furthermore, the method may be carried out in particular "online," expediently during the continuous operation of the processing unit.

According to one advantageous specific embodiment, if no free physical memory area exists, a check is performed to determine whether the virtual memory area, which is currently mapped onto the physical memory area that was recognized as faulty, should be mapped onto another of the physical memory areas. In this case, a check is performed to determine whether the virtual memory area allocated to the faulty physical memory area is to be mapped onto an already occupied physical memory area, onto which another physical memory area is already mapped. Thus, if no free memory area exists in the RAM memory unit, it is expediently possible to perform a redistribution of the allocations of virtual and physical memory areas, in particular in such a way that it is possible to continue correctly to execute at least the most important processes or the core functions of the processing unit.

Advantageously, this check is performed depending on which concrete processes executed in the processing unit access the individual virtual memory areas and thus in particular the physical memory areas. In particular, consideration is given to how relevant or functionally relevant these processes are. If a process that is relevant for the regular operation or the functionality of the processing unit accesses the faulty memory area, which should continue to be executed correctly for the error-free operation of the processing unit, a decision is made in particular that this process is to access another memory area. In particular, a respective memory area is selected in this case, which is accessed only rarely by processes or which is accessed by processes that are of secondary importance for the error-free operation. These respective processes are then suspended or respective functions of the processing unit are deactivated in favor of functionally relevant processes.

Preferably, an error detection method is carried out in order to detect whether particular physical memory areas of the RAM memory unit are faulty. For example, in the course of such an error detection method or an error correcting code or error checking and correction (ECC), a cyclic redundancy check (CRC) may be performed. In particular, the RAM memory unit is a so-called ECC RAM, which also has memory cells for ECC data in addition to memory cells for the user data. "Regular" RAM may also be used, whose capacity is then partially used for ECC information. In such an error check, an additional redundancy may be added to individual data blocks, for example in the form of additional bits, a computed check value or a computed checksum. In particular, the error detection method may be carried when corresponding data are read in from a physical memory area, in particular by the processing unit or by the operating system executed in the processing unit. If the read-in data are determined as not correct in the course of the error detection method, this may indicate an error of the corresponding physical memory area.

Preferably, the physical memory area is recognized as faulty if it has an irreparable error. Such an irreparable error is in particular to be understood as a permanent, enduring error of the RAM memory unit, in particular a hardware error or defect. Temporary, transient errors may occur for example due to fluctuations in the current supply or also due to electromagnetic noise and may be repaired by software measures such as error correction methods, for example. By contrast, an irreparable error results for example from a defect of a hardware component of the RAM memory unit, for example of a transistor or a diode. An irreparable defect therefore usually requires an exchange of the entire RAM memory unit. Often, it may not be readily possible to exchange the RAM memory unit upon detecting a defect, however, for example if the processing unit is used as a control unit for controlling a machine, in particular in a vehicle. The present method, however, makes it possible to allow for a reliable operation at least of the essential basic functions of the processing unit even in the case of a hardware defect of the RAM memory unit. In particular, a so-called "limp home" operation of the processing unit is made possible so that the processing unit may continue to be operated reliably in spite of the hardware defect, until the RAM memory unit can be repaired or exchanged. For example, for detecting an irreparable error, it is possible to use a counter for the occurrence of errors, an irreparable error being assumed when a predefined threshold value is reached or exceeded.

Preferably, the virtual memory areas are mapped onto the physical memory areas with the aid of a memory management table.

The memory management table expediently stores corresponding allocations of the virtual memory addresses to the physical memory addresses. The memory management table is in particular managed by the memory management unit.

Preferably, a corresponding entry in the memory management table is changed in order to map the virtual memory area, which is currently mapped onto the physical memory area detected as faulty, henceforth onto the free physical memory area or onto another physical memory area. In order to respond to the detected faulty memory area, the present method thus merely necessitates changes in the memory management table. Particularly expediently, no changes are made to software, particularly not to the source codes of the processes executed in the processing unit. Furthermore, no changes are required in particular in the operating system. The redistribution of processes to memory areas is taken into account, in particular automatically, by the processing unit or the operating system by using the correspondingly changed memory management table.

In particular, corresponding changes in the memory management table are executed by the operating system of the processing unit. In particular, following every change, the memory management table is stored in a nonvolatile memory unit of the processing unit and may be read in from there for example during every startup of the processing unit or the operating system. Thus it is possible to store the current allocation of the virtual and physical memory areas in permanent fashion. In particular, the memory management table furthermore may be stored in the nonvolatile memory unit by way of a cyclical redundancy check (CRC). Expediently, this nonvolatile memory unit furthermore may be used to store the further table or configuration file, in which the designation of the faulty physical memory areas is stored.

The method is particularly suitable for application in the vehicle sector. The processing unit may be designed in particular as a microcontroller or control unit in a (motor) vehicle. Processes executed by the processing unit may comprise for example safety-critical functions, which are executed for the safe operation and control of the vehicle, for example in the course of an engine control process or in the course of driver assistance functions etc. The method makes it possible to continue to execute safety-critical functions for operating the vehicle correctly even in the event of a defect of a RAM memory unit. The present method makes it possible to increase the reliability or safeguard against failure and integrity of the control unit. In particular, the method makes it possible to fulfill safety requirements in the (motor) vehicle sector, as specified for example in the ISO 26262 standard or in particular by the so-called "Automotive Safety Integrity Level" (ASIL), a safety requirement level for safety-related systems in motor vehicle specified by ISO 26262.

A processing unit according to the present invention, e.g., a microcontroller or control unit of a motor vehicle, is designed, particularly in terms of program technology, to carry out a method according to the present invention.

The implementation of a method according to the present invention in the form of a computer program or computer program product having program code for performing all method steps is also advantageous, since this incurs particularly low costs, especially if an executing control unit is also used for other tasks and is therefore present anyway. Suitable storage media for providing the computer program are in particular magnetic, optical and electrical storage media such as, e.g., hard disks, flash memories, EEPROMs, DVDs and others. A download of a program via computer networks (Internet, intranet, etc.) is also possible.

Additional advantages and developments of the present invention derive from the description herein and the figures.

The present invention is represented schematically in the figures on the basis of exemplary embodiments and described below with reference to the figures.

DETAILED DESCRIPTION OF EXAMPLE EMBODIMENTS

Figure 1:
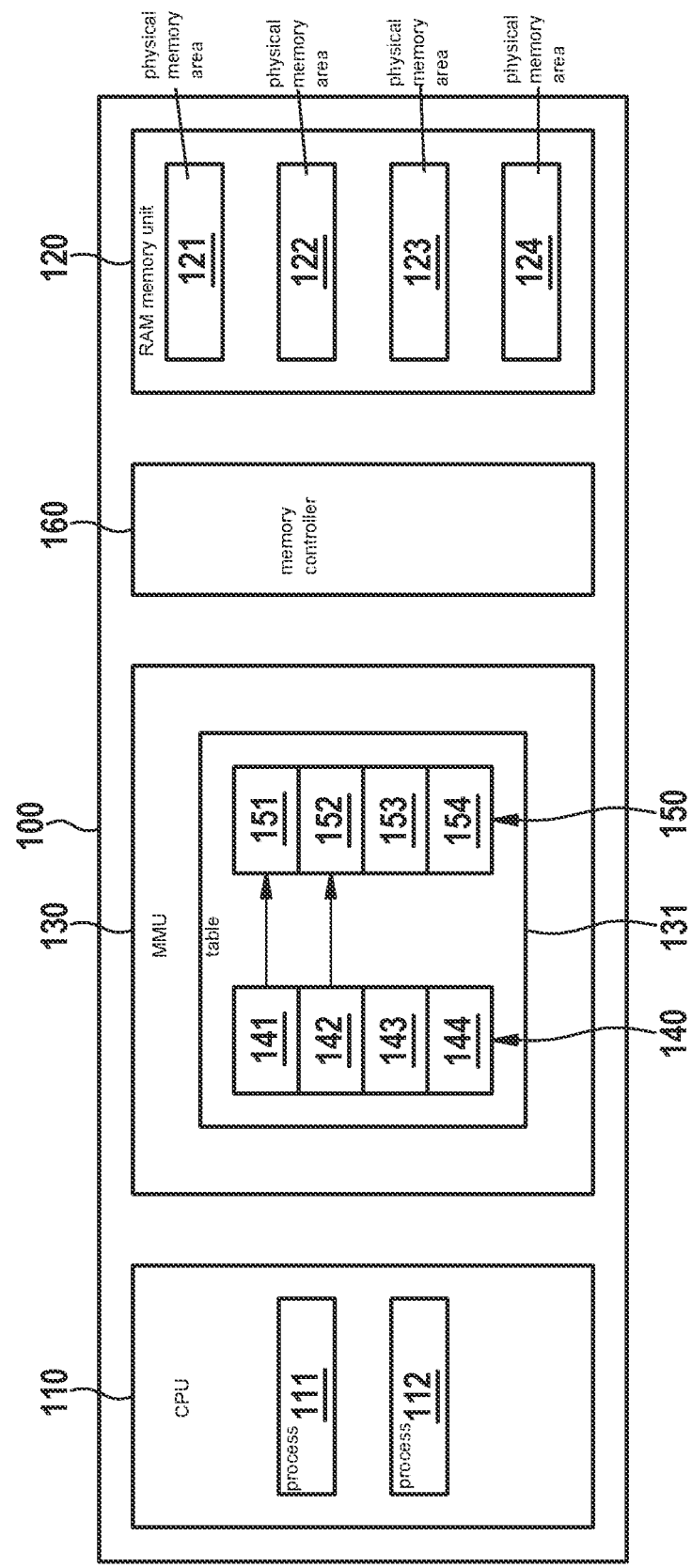
FIG. 1 shows schematically a processing unit that is designed to implement a preferred specific embodiment of a method according to the present invention.

FIG. 1 schematically shows a processing unit 100, which takes the form for example of a microcontroller in a control unit of a motor vehicle.

Control unit 100 comprises a processor unit 110 (CPU), in which a plurality of processes 111, 112 are executed. A RAM memory unit 120 of control unit 100 takes the form of a DRAM memory for example. The RAM memory unit 120 comprises a plurality of physical memory areas ("frames") 121, 122, 123, 124.

These physical memory areas 121, 122, 123, 124 may be addressed using physical memory addresses. These actual, physical memory addresses, however, are not known to processor unit 110 or to the processes 111, 112 executed in processor unit 110. In order to access RAM memory unit 120, processes 111, 112 respectively address virtual memory areas ("frames") using virtual memory addresses.

These virtual memory addresses are translated by a memory management unit 130 (MMU) into the actual, physical memory addresses. The memory management unit 130 thus maps the virtual memory areas onto the physical memory areas. For this purpose, memory management unit 130 comprises a memory management table ("page table") 131. Table 131 comprises a plurality of first entries 140, each of these entries 141, 142, 143, 144 respectively representing one virtual memory area with its virtual memory address. Accordingly, a plurality of second entries 150 is furthermore provided, each of these entries 151, 152, 153, 154 respectively representing one physical memory area with its physical memory address. Individual entries 140 referring to the virtual memory areas are allocated to corresponding entries 150 referring to the physical memory areas.

Entry 151, for example, represents memory area 121. Entry 152, for example, represents memory area 122. Entry 153, for example, represents area 123 and entry 154, for example, represents memory area 124.

Furthermore, entry 141 is allocated to entry 151, for example. The virtual memory area, which is represented by this entry 141, is thus mapped onto physical memory area 121, for example. Accordingly, entry 142 is allocated to entry 152, for example.

The virtual memory area, which is represented by this entry 142, is mapped onto physical memory area 122, for example.

Entries 143, 144 and 153, 154, respectively, are not allocated to an entry, for example. No virtual memory is thus mapped onto the physical memory areas 123 and 124, for example.

If for the purpose of accessing RAM memory unit 120, a process addresses a virtual memory area, memory management unit 130 translates the corresponding virtual memory address into the associated physical memory address using memory management table 131. With the aid of this physical memory address, a memory controller 160 is able to access the corresponding physical memory area of RAM memory unit 120 and transmit the data stored in it to the process.

Figure 2:
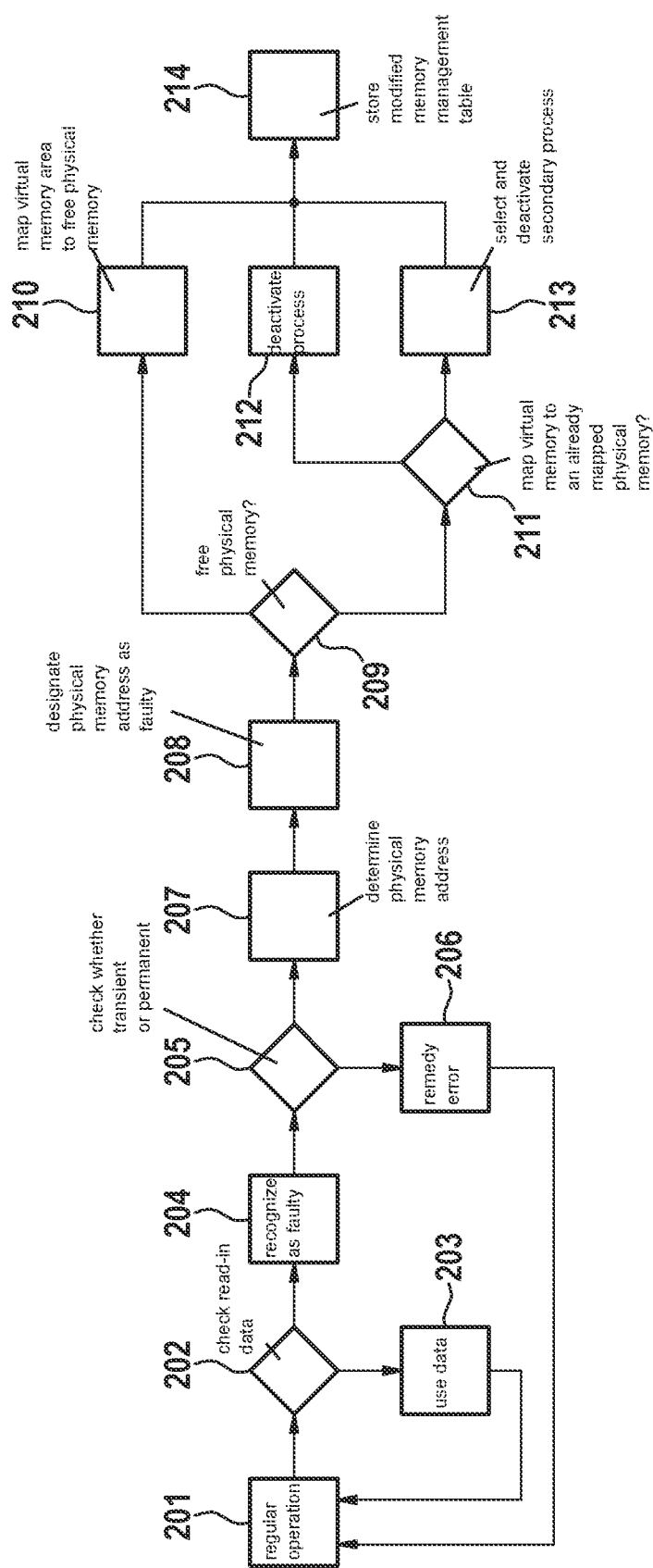
FIG. 2 shows schematically a preferred specific embodiment of a method according to the present invention as a block diagram.

In order to be able to respond to a hardware error or a defect of a memory area 121, 122, 123, 124 of RAM memory unit 120, processing unit 100 is designed, in particular in terms of program technology, to execute a preferred specific embodiment of a method according to the present invention, which is shown schematically as a block diagram in FIG. 2 and will be explained below.

In step 201, the processing unit is operated in regular fashion. For example, process 111 wants to access a memory area of RAM memory unit 120. For this purpose, process 111 or processor unit 110 transmits to memory management unit 130 a request for access to a virtual memory area via a corresponding virtual memory address, for example to the virtual memory area represented by entry 141 in memory management table 131.

With the aid of memory management table 131, memory management unit 130 translates this virtual memory address into the corresponding physical memory address, for example of physical memory area 121. Memory controller 160 reads in the data from this memory area 121 and returns the read-in data to processor unit 110.

In a parallel step 202, which occurs in particular whenever a physical address is accessed, processor unit 110 performs a check of the read-in data with the aid of an error detection method (ECC) and thus expediently a check of physical memory area 121 or of RAM memory unit 120.

If the data are recognized as error-free in step 203, these data are used by process 111, and the regular operation 201 of control unit 100 is continued.

However, if in the course of the error check in step 204, the read-in data are recognized as faulty, this could indicate a transient error of memory area 121, for example due to electromagnetic noise, or a permanent error, e.g., due to a hardware defect of RAM memory unit 120. In this case, a check is performed in step 205 to determine whether the error is a transient error or a permanent error of RAM memory unit 120, for example by using an error counter value.

If it is determined in step 205 that a transient error occurred, then this error is remedied in step 206, for example by a software measure, and the regular operation 201 of control unit 100 may be continued.

However, if it is determined in step 205 that there exists a permanent error, the physical memory address of this faulty memory area 121 is first determined in step 207. In step 208, this memory area 121 is designated as faulty. For this purpose, memory area 121 may be designated as faulty in a further table or in a configuration file for example, which is stored in particular in a nonvolatile memory unit of control unit 100 and is safeguarded by a cyclic redundancy check (CRC).

A check is performed in step 209 to determine whether a free physical memory area exists in RAM memory unit 120 onto which no virtual memory area is mapped and which is not designated as faulty. This check may be performed for example with the aid of the respective configuration file or further table and may be performed for example by memory management unit 130 itself or by processor unit 110 or by an operating system executed by the latter.

For this purpose, a check is performed for example to determine whether one of entries 150, which represents one of the physical memory areas of RAM memory unit 120, is not allocated to any of the entries 140 that represent the virtual memory areas.

If such a free physical memory area exists, then, in step 210, the virtual memory area that is currently mapped onto the physical memory area 121 that was recognized as faulty is henceforth mapped onto this free physical memory area.

As explained above, no virtual memory areas are allocated to entries 153 and 154 for example and no virtual memory area is mapped onto physical memory areas 123 and 124, for example.

Entry 141 is allocated to entry 153, for example. The virtual memory area, which is characterized accordingly by entry 141, is now mapped onto physical memory area 123. In this case, processes 111, 112 and the corresponding functions of control unit 100 may continue to be executed in particular without limitations.

If on the other hand it is determined in step 209 that no free physical memory area exists, then it is not readily possible to use a free memory area as replacement for the faulty memory area 121 without limitations of the functionality of control unit 100.

In this case, a check is performed in step 211 to determine whether the virtual memory area that is currently mapped on physical memory area 121 recognized as faulty is to be mapped onto another of the physical memory areas, on which another virtual memory area is already mapped.

For this purpose, in particular, account is taken of the fact which concrete processes executed in the processing unit access the individual virtual memory areas and thus the individual physical memory areas. For example, a secondary process may be identified that is not required for the fundamental or basic function of the control unit.

If the process 111 that accesses the faulty physical memory area 121 is itself such a secondary process, then this process 111 is deactivated in step 212. The virtual memory area, which is mapped onto faulty physical memory area 121, is in this case not mapped onto any other physical memory area.

However, if the process 111 accessing faulty physical memory area 121 is not a secondary process, but rather a functionally relevant process for example, a secondary process is selected and deactivated in step 213. If this deactivated process accessed physical memory area 124 for example via a corresponding virtual memory address, functionally relevant process 111 is henceforth permitted to access this memory area 124. For this purpose, the entry 141, which represents the corresponding virtual memory area, which is accessed by process 111, is accordingly allocated to entry 154 in memory management table 131, which represents physical memory area 124. To be sure, in this case, due to the error in RAM memory unit 120, it is no longer possible to execute all processes 111, 112 and functions of control unit 100 without limitations, but at least it is still possible to execute the basic function of control unit 100.

In step 214, the modified memory management table 131, which was changed in step 210, 212 and 213, respectively, is stored in a nonvolatile memory unit of control unit 100, in which for example the further table or configuration file including the designations of the faulty physical memory areas is stored as well. In particular, memory management table 131 is safeguarded in this nonvolatile memory unit further by way of a cyclical redundancy check (CRC).

From the nonvolatile memory unit, the modified table 131 is read in by control unit 100 and used for the further operation of control unit 100. It is possible that control unit 100 may have to be restarted so as to be able to read in the modified memory management table 131.

The present method thus makes it possible to respond to an irreparable hardware error of RAM memory unit 120 and to be able to continue to execute at least the basic function of control unit 100. For this purpose, in particular no changes are required in the processes executed by control unit 100 or in their source codes. Furthermore, no changes are required in the operating system of control unit 100. In particular, changes are performed in memory management unit 130 or memory management table 131 only in order to change an allocation of processes to memory areas of the RAM memory unit.

What is claimed is:

1. A method for operating a processing unit, the method comprising the following steps:
   addressing, by the processing unit, virtual memory areas to access a RAM memory unit, each individual virtual memory area of the virtual memory areas being respectively mapped onto a respective physical memory area of the RAM memory unit;
   performing a check of the RAM memory unit for errors;
   designating, when, during the check of the RAM memory unit for errors, a physical memory area of the RAM memory unit is determined to have a hardware defect, the physical memory area having the hardware defect as faulty;
   performing a check to determine whether a free physical memory area exists in the RAM memory unit onto which no virtual memory area is mapped and which is not designated as faulty;

mapping, when the free physical memory area exists, a virtual memory area, currently mapped onto the physical memory area determined to have the hardware defect and designated as faulty, to the free physical memory area; and when the free physical memory area does not exist:
  determining, depending on which concrete processes executing in the processing unit access the individual virtual memory areas, whether the virtual memory area currently mapped onto the physical memory determined to have the hardware defect and designated as faulty should be mapped onto another one of the respective physical memory areas, and
  based on the determination, selecting a process of the concrete processes to deactivate, deactivating the selected concrete process, and mapping the virtual memory area currently mapped onto the physical memory area determined to have the hardware defect and designated as faulty, to the respective physical memory area onto which a virtual memory area of the individual virtual memory areas accessed by the selected concrete process is mapped.

2. The method as recited in claim 1, wherein an error detection method is performed in order to detect whether individual physical memory areas of the RAM memory unit have a hardware defect.

3. The method as recited in claim 1, wherein the physical memory area is designated as faulty when the physical memory area has an irreparable hardware defect.

4. The method as recited in claim 1, wherein the individual virtual memory areas are mapped onto the respective physical memory areas using a memory management table.

5. The method as recited in claim 4, wherein, to map the virtual memory area that is currently mapped onto the physical memory area designated as faulty onto the free physical memory area or onto another of the physical memory areas, a corresponding entry in the memory management table is changed.

6. The method as recited in claim 1, wherein:
  the individual virtual memory areas are mapped onto the respective physical memory areas using a memory management table stored in nonvolatile memory;
  the designating includes designating, in a further table stored in nonvolatile memory or in or configuration file stored in nonvolatile memory, the physical memory area of the RAM memory determined to have the hardware defect as faulty; and
  the mapping to the free physical memory area includes changing the memory management table to map the virtual memory area currently mapped onto the physical memory area determined to have the hardware defect and designated as faulty to the free physical memory area.

7. A processing unit configured to:
perform a check of a RAM memory unit for errors;
designate, when, during the check of the RAM memory unit for errors, a physical memory area of the RAM memory unit is determined to have a hardware defect, the physical memory area having the hardware defect as faulty;
perform a check to determine whether a free physical memory area exists in the RAM memory unit onto which no virtual memory area is mapped and which is not designated as faulty;
map, when the free physical memory area exists, a virtual memory area, currently mapped onto the physical memory area determined to have the hardware defect and designated as faulty, to the free physical memory area; and when the free physical memory area does not exist:
  determine, depending on which concrete processes executing in the processing unit access the individual virtual memory areas, whether the virtual memory area currently mapped onto the physical memory determined to have the hardware defect and designated as faulty should be mapped onto another one of the respective physical memory areas, and
  based on the determination, select a process of the concrete processes to deactivate, deactivate the selected concrete process, and map the virtual memory area currently mapped onto the physical memory area determined to have the hardware defect and designated as faulty, to the respective physical memory area onto which a virtual memory area of the individual virtual memory areas accessed by the selected concrete process is mapped.

8. A non-transitory machine-readable storage medium on which is stored a computer program for operating a processing unit, the computer program, when executed by a computer, causing the computer to perform the following steps:
  addressing, by the processing unit, virtual memory areas to access a RAM memory unit, each individual virtual memory area of the virtual memory areas being respectively mapped onto a respective physical memory area of the RAM memory unit;
  performing a check of the RAM memory unit for errors;
  designating, when, during the check of the RAM memory unit for errors, a physical memory area of the RAM memory unit is determined to have a hardware defect, the physical memory area having the hardware defect as faulty;
  performing a check to determine whether a free physical memory area exists in the RAM memory unit onto which no virtual memory area is mapped and which is not designated as faulty;
  mapping, when the free physical memory area exists, a virtual memory area currently mapped onto the physical memory area determined to have the hardware defect and designated as faulty, to the free physical memory area; and
  when the free physical memory area does not exist:
    determining, depending on which concrete processes executing in the processing unit access the individual virtual memory areas, whether the virtual memory area currently mapped onto the physical memory determined to have the hardware defect and designated as faulty should be mapped onto another one of the respective physical memory areas, and
    based on the determination, selecting a process of the concrete processes to deactivate, deactivating the selected concrete process, and mapping the virtual memory area currently mapped onto the physical memory area determined to have the hardware defect and designated as faulty, to the respective physical memory area onto which a virtual memory area of the individual virtual memory areas accessed by the selected concrete process is mapped.

9. A method for operating a processing unit, the method comprising the following steps:
  addressing, by the processing unit, virtual memory areas to access a RAM memory unit, each individual virtual memory area of the virtual memory areas being respectively mapped onto a respective physical memory area of the RAM memory unit;

performing a check of the RAM memory unit for errors;

designating, when, during the check of the RAM memory unit for errors, a physical memory area of the RAM memory unit is determined to have a hardware defect, the physical memory area having the hardware defect as faulty;

performing a check to determine whether a free physical memory area exists in the RAM memory unit onto which no virtual memory area is mapped and which is not designated as faulty;

based on the check, determining the free physical memory does not exist;

determining, depending on which concrete processes executing in the processing unit access the individual virtual memory areas, whether the virtual memory area currently mapped onto the physical memory determined to have the hardware defect and designated as faulty should be mapped onto another one of the respective physical memory areas; and based on the determination, selecting a process of the concrete processes to deactivate, deactivating the selected concrete process, and mapping the virtual memory area currently mapped onto the physical memory area determined to have the hardware defect and designated as faulty, to the respective physical memory area onto which a virtual memory area of the individual virtual memory areas accessed by the selected concrete process is mapped.

* * * * *